March 4, 1969

G. FORBES 3,431,084

FIXED-BED CATALYTIC OPERATIONS

Filed Sept. 7, 1966

INVENTOR
GEORGE FORBES

BY
MORGAN, FINNEGAN, DURHAM & PINE
ATTORNEYS

March 4, 1969     G. FORBES     3,431,084
FIXED-BED CATALYTIC OPERATIONS
Filed Sept. 7, 1966     Sheet 2 of 2
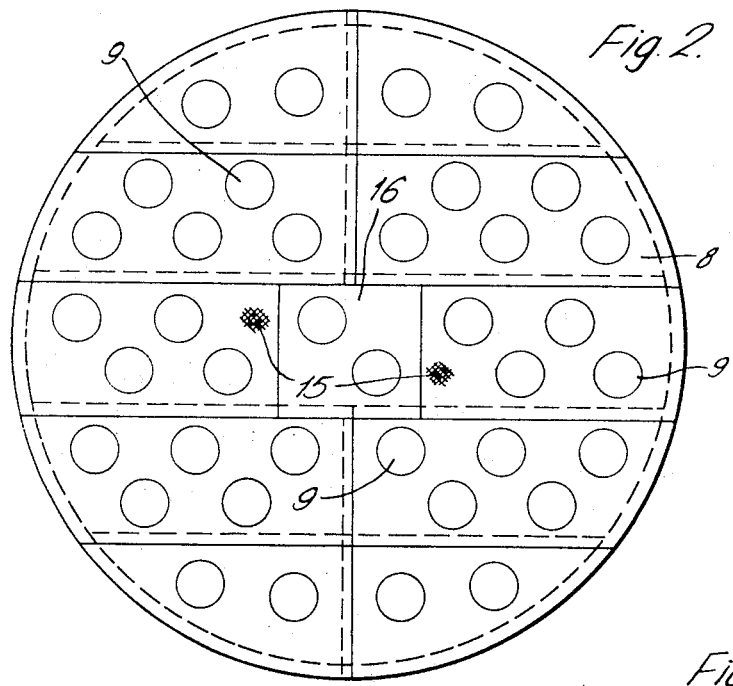
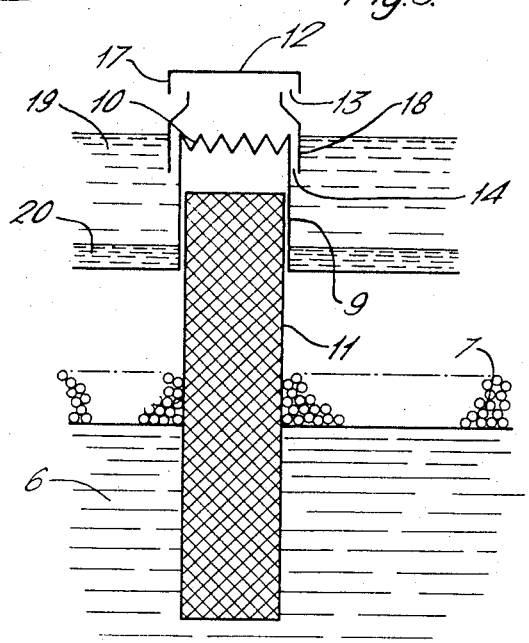
INVENTOR
GEORGE FORBES
BY
MORGAN, FINNEGAN, DURHAM & PINE
ATTORNEYS

United States Patent Office 3,431,084
Patented Mar. 4, 1969

3,431,084
FIXED-BED CATALYTIC OPERATIONS
George Forbes, Hornchurch, Essex, England, assignor to The British Petroleum Company Limited, London, England, a corporation of England
Filed Sept. 7, 1966, Ser. No. 577,716
Claims priority, application Great Britain, Sept. 15, 1965, 39,355/65
U.S. Cl. 23—288
Int. Cl. B01j 9/04
6 Claims This invention relates to apparatus for use in fixed-bed catalytic operations, and particularly apparatus for assisting in the distribution of liquid and vapour in a down-flow, catalyst-containing reactor vessel. The invention also includes processes using such apparatus.

Experience in operating certain catalytic processes, particularly the catalytic desulphurisation of petroleum fractions such as, for example, gas oil, has shown that deposits tend to build up on top of the catalyst bed resulting in an increased pressure drop across the reactor and consequently a reduction in unit throughput. Under these conditions it is necessary, periodically, to shut down the unit in order to regenerate the catalyst by burning off the deposit even though the catalytic activity of the bulk of the catalyst bed remains high.

The blocking deposits are caused, it is believed, by a combination of cracking and polymerisation side reactions taking place to a limited extent on the surface of the catalyst bed, and the importation of particulate materials with the feed, for example ferrous scale from plant such as furnace tubes.

It has been suggested previously to insert a series of open-topped wire mesh cylinders into the catalyst bed extending from the catalyst surface into the bed. Such an arrangement has led to some improvement in on-stream time, for further improvement is still desirable.

Particular problems arise when mixed phase conditions exist in the reactor (i.e. both liquid and vapour are passing onto and through the catalyst bed), since not only has the build-up of deposits to be controlled, but also good distribution and mixing of the liquid and vapour has to be ensured. One proposed device for mixed-phase feeds has a tray above the catalyst with separate passages through the tray for liquid and gas. The gas passages have wire-mesh cylinders extending into the catalyst bed and the liquid passages are chimneys distributing liquid on to the surface of the bed.

The present invention is concerned with devices which allow both liquid and vapour to flow through the same passages in the tray.

According to the present invention, therefore, apparatus suitable for carrying out fixed-bed catalytic reactions comprises a closed, vertical, reactor capable of holding a bed of catalyst and having an upper inlet and a lower outlet, a tray across the upper part of the vessel, chimneys extending upwardly from the tray, screening means within the chimneys extending downwardly through the chimneys into the catalyst bed when the latter is in position, and cowls above the chimneys, having two entrances one above the other, which allow entry of fluids into and through the chimney only with an initially upward direction of flow, the lower entrance being on a horizontal level with the top of the chimney and the upper entrance being above the top of the chimney.

The invention also includes a method of operating a down-flow reactor containing a fixed bed of catalyst with feedstocks which consist of both liquid and vapour comprising forming a pool of liquid in the upper part of the reactor on a tray, allowing liquid to flow over the lip of a chimney through the tray into the catalyst bed via screening means extending through the chimney into the catalyst bed, and allowing vapour to pass through the same chimney and screening means via an entrance above the pool of liquid which compels the vapour to reverse its downward direction of flow in order to enter the chimney and screening means.

Thus the invention essentially comprises a tray in the upper part of a reactor and passages through the tray for liquid and vapour feed, these passages having screening means and separate entrances for the liquid and vapour. Both entrances compel the liquid and vapour to reverse direction and flow upwardly for a while in order to enter the passage and this allows particles carried in the liquid and vapour to settle out and be deposited on the tray. However the conditions which encourage deposition of particles are different for liquid and vapour. A low liquid flow rate encourages deposition of suspended particles whereas high flow rates assist the separation of particles from gas, the particles being flung out by centrifugal force as the gas reverses direction. By having separate entrances for liquid and vapour the optimum conditions can be chosen for each. Turbulence is also reduced by having separate entrances, again assisting in the settling out of particles. On the other hand since both liquid and vapour go through the same passage good liquid-vapour contact is ensured once the mixture reaches the catalyst bed.

The lip of the chimney is preferably serrated to give an even steady multi-stream flow over the lip into the passage. The chimney may be of any suitable cross section, but it is conveniently cylindrical in shape.

The double-entrance cowl is preferably a single unit formed from a cover and side walls connected by narrow brackets so that the vapour entrance is not obstructed more than necessary. The cowl fits above and around the upper part of the chimney. With a cylindrical chimney the cowl will also by cylindrical with annular liquid and vapour entrances. Preferably the cowl is removable to permit withdrawal of the screening means.

The screening means are preferably perforated tubes, which may conveniently be constructed from wire mesh. The tray, chimneys and cowls should ensure that liquids and vapour passing into the perforated tubes are substantially free of deposits but the tubes are a second safeguard against deposits entering the catalyst bed itself. The tubes, extending as they do into the catalyst bed, also help to distribute the liquid and vapour evenly through the bed. The screening means are, as stated above, preferably removable and are thus not permanently fixed to the chimneys.

The top of the catalyst bed may have a layer of inert bodies, for example ceramic balls, on it in conventional manner and there is preferably a space between the top of the catalyst bed or layer of ceramic balls and the tray. Some of the liquid and, particularly, some of the vapour can thus pass through the perforated tube into this space and enter the catalyst bed via its upper surface.

The dimensions of the chimneys, screening means, cowls and liquid and vapour entrances may be chosen according to the particular conditions expected in the reactor, particularly the relative amounts of liquid and vapour. The number of chimneys, screening means and cowls can also be varied depending on the size of the reactor and the conditions expected in it. A relatively large number, for example at least 15 to 20 for small reactors and up to 40 to 70 for larger reactors, would be convenient. The aim in designing a tray assembly is to maximise the number of passages through the tray and so minimise the increase in velocity through the passages, while at the same time leaving an adequate tray surface on which deposits may build up.

Although the apparatus is designed particularly for use with mixed-phase feedstocks, for example feedstocks with from 20–80% of liquid under the conditions used, the apparatus will still function effectively if conditions are altered to give wholly vapour-phase operation, the vapour then passing through both entrances of the cowl with reversal of direction of flow in each case.

The invention is illustrated by the accompanying drawings in which:

FIGURE 2 is a plan view of a tray, and

FIGURE 3 is a section through an individual chimney assembly showing this in greater detail than in FIGURE 1.

Figure 1:
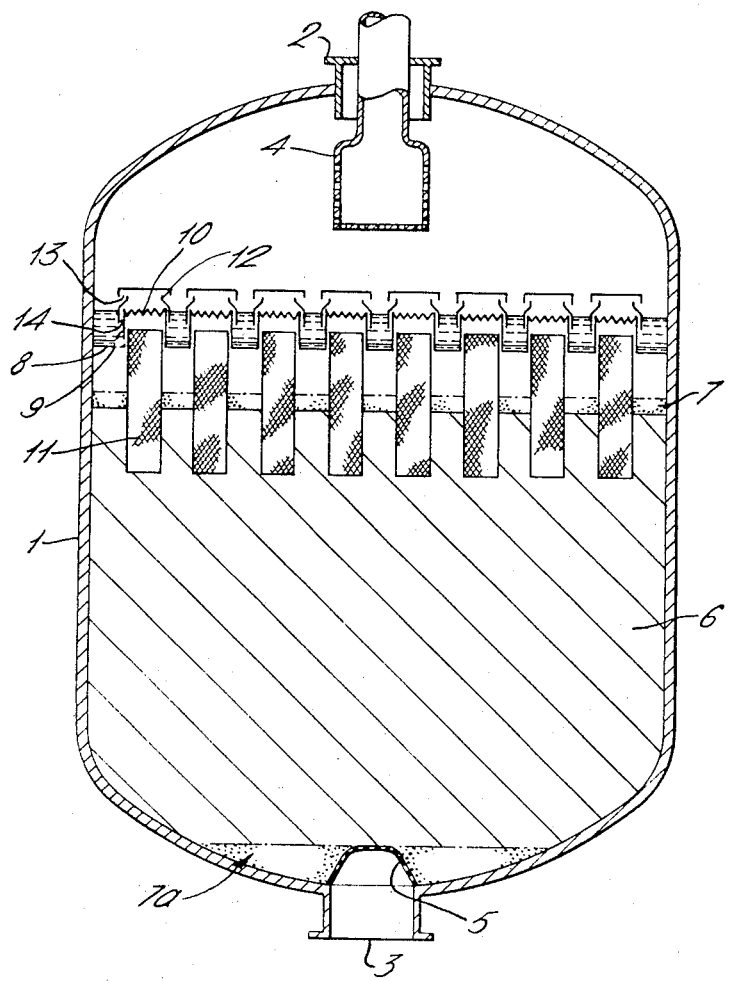
FIGURE 1 is a section through a reactor according to the present invention

In FIGURE 1 a reactor is formed from a shell 1 with an upper inlet 2 and lower outlet 3. The inlet 2 has a suitable distribution device indicated diagrammatically at 4. A perforated sheet 5 covers the outlet 3. The reactor contains a bed of catalyst 6 which has, at its top and bottom, layers of ceramic balls 7 and 7a. Above and spaced from the catalyst bed is a tray 8 having a number of chimneys 9 with serrated lips 10. Wire mesh baskets 11 fit inside the chimneys 9 and extend down into the catalyst bed 6. The baskets 11 are open at their tops but closed at their lower ends. Above the chimneys 9 are cowls 12 having an upper annular entrance 13 and a lower annular entrance 14.

FIGURE 2 shows the tray 8 in plan with chimneys 9 distributed over it. The tray is shown as formed from a number of plates joined together with liquid-tight joints and there are drain holes 15 covered with wire mesh to allow the tray to be drained of liquid when the reactor has to be shut down. The centre section 16 of the tray is removable to allow access to the section of the reactor containing catalyst bed 6. The baskets 11 and cowls 12 are not shown in FIGURE 2.

FIGURE 3 shows an individual chimney assembly in greater detail than in FIGURE 1, similar parts being shown with similar numerals. In FIGURE 3 it will be seen that the cowl 12 is formed of a cover 17 and a skirt 18 joined by brackets (not shown). The cowl 12 is clipped onto the chimney 9 by clips (not shown) in such a way that it can be detached from the chimney. This allows basket 11, which is free sliding in the chimney 9, to be removed by drawing it up through the chimney. The figure also shows a pool of liquid 19 held up on the tray 8 to the level of the lip 10 of chimney 9 and a layer of sediment 20 on the floor of the tray 8.

In operation, mixed-phase feed enters the reactor 1 through inlet 2 and distributor 4. Liquid falls onto tray 8 and builds up a pool of liquid 19 until the liquid rises up through lower entrance 14 of cowl 12 and over the lip 10 of chimney 9 into basket 11. Thereafter the liquid level remains constant at the level of lip 10. Particles suspended in the liquid drop to the floor of tray 8 to form a layer of sediment 20. The vapour in the feed is denied entry into lower entrance 14 once the liquid level has risen to it and hence goes into upper entrance 13. In doing so it has to reverse direction and enter the cowl 12 upwardly. Suspended particles drop out as the vapour changes direction and fall onto the liquid pool 19 and down through it to join the layer of sediment 20.

The liquid and vapour pass together through the basket 11, some passing through the upper part of the basket into the space between the tray 8 and the layer of ceramic balls 7 and thence into the catalyst bed 6, and some passing through the lower part of the basket directly into the catalyst bed 6. The liquid and vapour flow down through the bed and the products emerge through outlet 3.

By way of illustration, for a reactor of 6 to 8 ft. internal diameter filled with ⅛ inch x ⅛ inch catalyst pellets the tray can have 30–60 chimneys of 4 to 8 inches diameter and 6 to 12 inches high. The baskets may be 2 to 3 ft. long and extend into the catalyst bed to a depth of 1 to 2 ft. The baskets may be of 8 x 8 mesh with wire of 18 gauge. The size of the annular entrances to the cowl will depend on the relative amounts of liquid and vapour expected, the liquid entrance being correspondingly bigger and the vapour entrance smaller as the proportion of liquid to vapour increases. It should be possible, however, by suitable adjustment to have liquid flow rates of the order of 0.1 ft./second through the liquid entrance and vapour flow rates of the order of 5 ft./second through the vapour entrance.

The apparatus of the present invention may be used for any down-flow fixed bed catalytic process. It is particularly useful for the catalytic treatment of hydrocarbon such as petroleum fractions in the presence of hydrogen. Such hydrocatalytic treatment may be used to purify the feedstock (as for example in desulphurisation or denitrogenation) or to convert it (as for example in hydrocracking). The petroleum feedstocks which would give mixed-phase conditions under the hydrocatalytic conditions normally used are fractions boiling above 200° C., particularly the gas oil and wax distillate fractions. The hydrocatalytic process conditions particularly when the main object is hydrocatalytic desulphurisation may be 400–850° F. and 50–2000 p.s.i.g. at a space velocity of 0.5 to 20 v./v./hr. with 200–10000 s.c.f./b. of hydrogen. Catalysts suitable for use in such a process may comprise oxides of Groups VIa and VIII of the Periodic Table supported on a refractory oxide support, for example cobalt and molybdenum oxides supported on alumina. The present invention includes such a hydrocatalytic process in which the apparatus hereinbefore described is used.

I claim:

1. Apparatus suitable for carrying out fixed-bed catalytic reactions comprising a closed, vertical reactor capable of holding a bed of catalyst and having an upper inlet and a lower outlet, a tray across the upper part of the vessel, chimneys extending upwardly from the tray, screening means within the chimneys extending downwardly through the chimneys into the catalyst bed when the latter is in position, and cowls above the chimneys, having two entrances one above the other, which allow entry of fluids into and through the chimney only with an initially upward direction of flow, the lower entrance being on a horizontal level with the top of the chimney and the upper entrance being above the top of the chimney.

2. Apparatus as claimed in claim 1 wherein the lip of the chimney is serrated.

3. Apparatus as claimed in claim 1 wherein the cowls and chimneys are cylindrical.

4. Apparatus as claimed in claim 1 wherein the reactor has from 15 to 70 chimneys and cowls.

5. A method of operating a down-flow reactor containing a fixed bed of catalyst with feedstocks which consist of both liquid and vapour comprising forming a pool of liquid in the upper part of the reactor on a tray, allowing liquid to flow over the lip of a chimney through the tray into the catalyst bed via screening means extending through the chimney into the catalyst bed, and allowing vapour to pass through the same chimney and screening means via an entrance above the pool of liquid which compels the vapour to reverse its downward direction of flow in order to enter the chimney and screening means.

6. A method as claimed in claim 5 wherein the amount of liquid is from 20 to 80% of the total feedstock.

References Cited

UNITED STATES PATENTS

| | | | |
|---|---|---|---|
| 3,112,256 | 11/1963 | Young et al. | 23—288 XR |
| 3,146,189 | 8/1964 | Kunrenther et al. | 23—288 XR |
| 3,378,349 | 4/1968 | Shirk | 23—288 |

MORRIS O. WOLK, *Primary Examiner.*

M. D. BURNS, *Assistant Examiner.*

U.S. Cl. X.R.

208—146